Figure 1:
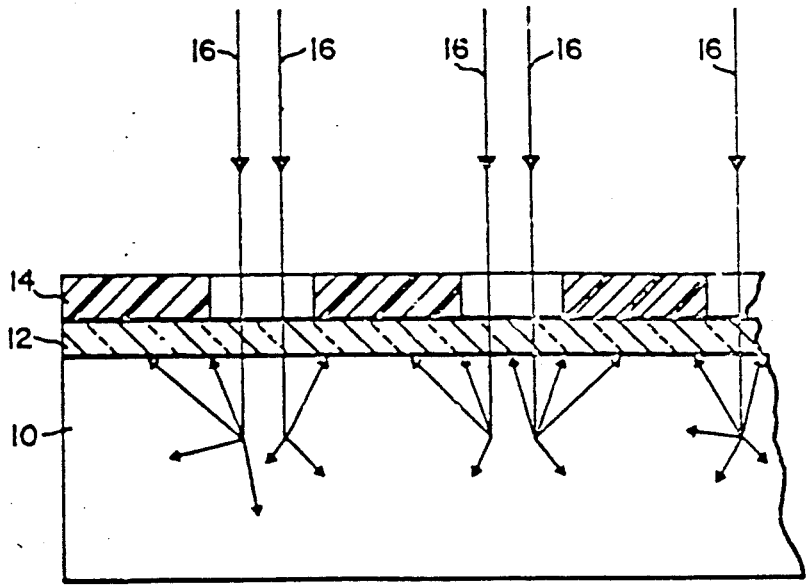
Figure 2:
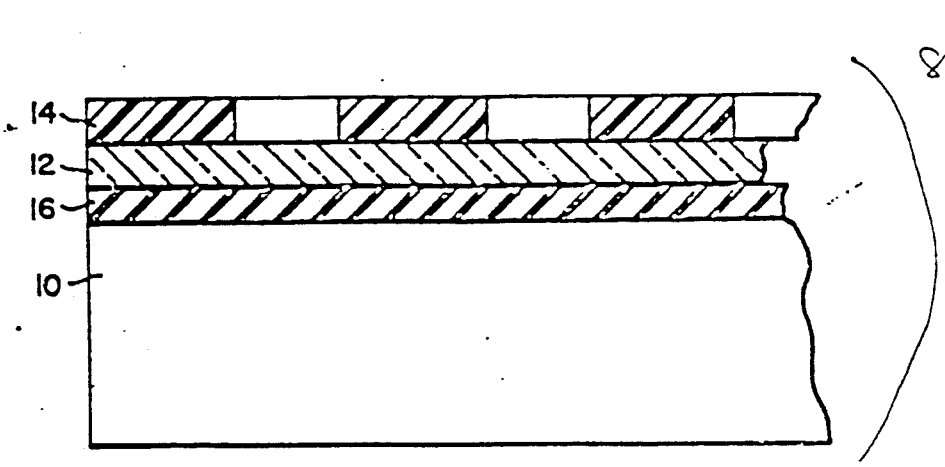

BEST AVAILABLE COPY

DEFENSIVE PUBLICATION T856,040

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 26, 1968

856 O.G. 1019

571,633

METHOD OF PREVENTING IMAGE DECAY OF PHOTO RESIST ON TRANSPARENT SUBSTRATES

Stuart M. Oliver, 424 N. Oakhurst Drive, Beverly Hills, Calif. 90210

Filed Aug. 10, 1966. Published Nov. 26, 1968
Class 96—84
1 Sheet Drawing. 9 Pages Specification

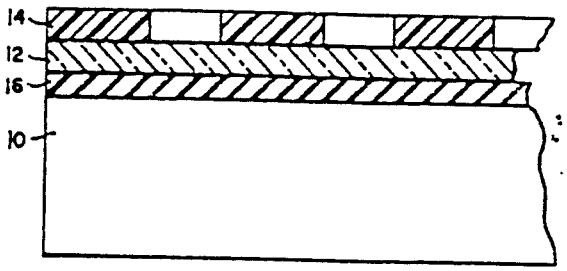

In the field of photoresist masking for high resolution substrates of transparent or translucent materials, light scattering decreases the definition of the mask. This invention aids in the reduction of such light scattering. The invention comprises the method of improving resolution of photoresist masks by coating the surface of the transparent or translucent substrate, prior to the application of the photoresist coating, with a thin film of material taken from the group consisting of metallic oxides, nitrides, sulfides, selenides, tellurides, arsenides, antimonides and silicon monoxide. The particular component of the thin film material should be chosen to absorb radiation over the spectral range of photosensitivity of the photoresist coating.

T856,040
571633

APPROVED BY DRAFTSMAN

BEST AVAILABLE COPY

Sheet 2/2
50.

INVENTOR.
STUART M. OLIVER
BY Joseph Dwyer
ATTORNEY

10